No. 761,090. PATENTED MAY 31, 1904.
I. MOSCICKI.
HIGH TENSION ELECTRIC CONDENSER.
APPLICATION FILED FEB. 17, 1904.
NO MODEL.

WITNESSES:
F. H. Schott
Edwin G. Balinger

INVENTOR
Ignacy Moscicki
BY
Georgii Massie
His Attorneys

No. 761,090. Patented May 31, 1904.

UNITED STATES PATENT OFFICE.

IGNACY MOSCICKI, OF FRIBOURG, SWITZERLAND.

HIGH-TENSION ELECTRIC CONDENSER.

SPECIFICATION forming part of Letters Patent No. 761,090, dated May 31, 1904.

Application filed February 17, 1904. Serial No. 194,028. (No model.)

*To all whom it may concern:*

Be it known that I, IGNACY MOSCICKI, a citizen of Austria-Hungary, residing at Fribourg, in the Republic of Switzerland, have invented certain new and useful Improvements in High-Tension Electric Condensers; and I do hereby declare the following is a full, clear, and exact description of the invention, such as will enable others skilled in the art to which it appertains to make and use the same.

This invention relates to high-tension electric condensers.

Under otherwise similar conditions (material of which the dielectric is composed and size of the coatings) the capacity of the condenser is inversely proportional to the thickness of the dielectric which separates the two coatings. In consequence of this the coatings must be as small as possible. On the other hand, however, the electrical pressure exercised on any part of the dielectric is proportional to the square of the electric pressure on the particular place in the coatings. If this pressure be increased anywhere beyond a maximum determined by the strength of the dielectric, the dielectric is broken at the particular spot, being penetrated by an electric spark. In order to avoid this, it has been necessary hitherto in the case of high-tension condensers to make use of dielectrics with relatively stout sides, involving the necessity of considerable expenditure of material and considerable space for such condensers, as in consequence of the considerable thickness the capacity of an element could only be slight. It has been proved that in the condensers employed hitherto, so far as the strength of the dielectric was not considerably impaired at any other spot by faults in the making, small cracks, or the like, the spot where a breakage occurred was usually found to be on the edge of a coating. The explanation of this is that the electric density at the edges of the coatings, and thus also the electric pressure, is greatest in these places.

The improvement in high-tension condensers, which forms the object of the present invention, consists in the parts of the dielectric which support the edges of the coatings being considerably thicker than the remaining parts covered by the coatings.

One form of the invention is illustrated in the accompanying drawings.

Figure 1:
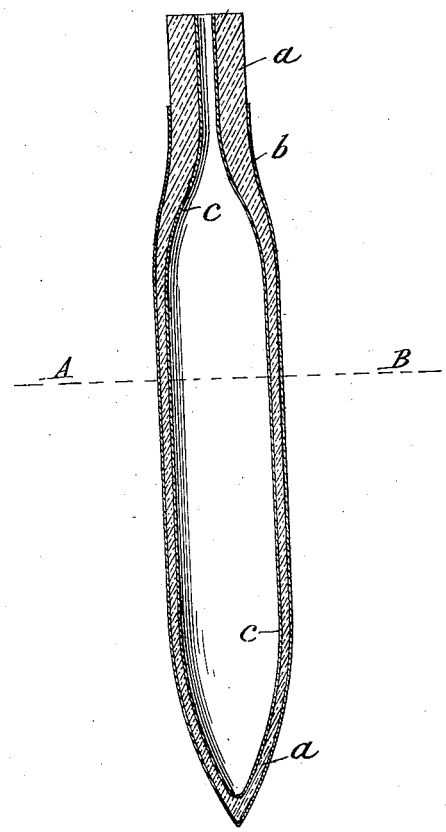
Figure 2:
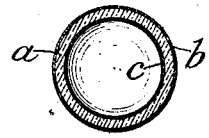

Figure 1 is a sectional elevation; Fig. 2, a section through A B in Fig. 1.

The tubular dielectric $a$ is much thicker at the top than in the middle. The bottom is closed and pointed and is considerably thicker than the middle. The dielectric consists of a material, such as glass, with a high electrical constant. The outer coating $b$ does not extend to the top of the dielectric, while the inner coating $c$ entirely covers the interior surface.

Experiments have proved that while hitherto glass tubes of a uniform thickness of 0.3 millimeter were broken under a tension of six thousand volts similar glass tubes, the parts of which supporting the edges of the coatings were, however, made sufficiently stout, were only broken under a pressure of thirty thousand volts.

In the form of the invention illustrated the thickenings are of the same material as the tube. The thickenings may, however, consist of some other material in the form of layers. Experiments, however, have shown that this material must have an equal, a higher, or a slightly lower dielectric constant if it is to act similarly.

So far as the dielectric consists of glass the coatings can be suitably formed by layers of silver adhering to the glass, which layers can be made very thin by silver-coating the dielectric.

What I claim as my invention, and desire to secure by Letters Patent, is—

1. In high-tension electric condensers, a dielectric thickened at those parts which support the edges of the coatings, substantially as described.

2. In high-tension electric condensers, a dielectric consisting of a tube, closed at one end, which is formed thicker than the cylindrical wall of the tube, and external and internal coatings on the tube completely covering the said end, substantially as described.

3. In an electric condenser, the combination, with a dielectric thickened at the parts of maximum electrical pressure, of conductive coatings on each side of said dielectric.

4. In an electric condenser, the combination, with a tube of dielectric material closed at one end and having thickened walls at its other end, of internal and external coatings on said tube.

In testimony whereof I have affixed my signature to this specification in the presence of two witnesses.

IGNACY MOSCICKI.

Witnesses:
 EDUARD VON WALDKIRCH,
 FRIEDRICH NAEGELI.